April 2, 1935.  J. E. PADGETT  1,996,170

APPARATUS FOR USE IN ASSEMBLING MACHINE ELEMENTS IN HOUSINGS

Filed Nov. 4, 1932  2 Sheets-Sheet 1

INVENTOR:
JOSEPH E. PADGETT
ATTORNEYS

April 2, 1935. J. E. PADGETT 1,996,170
APPARATUS FOR USE IN ASSEMBLING MACHINE ELEMENTS IN HOUSINGS
Filed Nov. 4, 1932 2 Sheets-Sheet 2

INVENTOR:
JOSEPH E. PADGETT
ATTORNEYS

Patented Apr. 2, 1935

1,996,170

UNITED STATES PATENT OFFICE 1,996,170

APPARATUS FOR USE IN ASSEMBLING MACHINE ELEMENTS IN HOUSINGS

Joseph E. Padgett, Toledo, Ohio

Application November 4, 1932, Serial No. 641,221

10 Claims. (Cl. 29—84)

This invention has to do with the assembling of machine elements in housings, and, as its principal object, aims to provide a novel method and apparatus for accurately and economically positioning machine elements in the housings in which they are to operate.

More specifically, my invention aims to provide a novel method and means for accurately mounting differentials, with a desired press fit, in differential housings of the one-piece type.

Another object of my invention is to provide a novel method for mounting a machine element, having anti-friction bearings thereon, in a housing, and in accordance with which method, axial pressure is applied to the anti-friction bearings between spaced members, and the machine element is then displaced from between the members and into the desired position in the housing while the axial pressure is being maintained.

A further object of my invention is to provide novel apparatus for mounting a machine element in a housing, with a press fit between the housing and the bearings of the machine element, wherein relatively movable guide members are adapted to receive the machine element therebetween and to subject the machine element to pressure, axially of the bearings, while it is being positioned in the housing.

Still another object of my invention is to provide novel apparatus for mounting a machine element in a housing with a press fit between the housing and the bearings of the element, wherein relatively movable guide members are adapted to receive the element therebetween and to subject it to pressure axially of the bearings, and wherein a plunger is arranged for movement between the guide members for displacing the machine element into the housing while the axial pressure is being maintained.

My invention may be further briefly summarized as consisting in certain novel steps of procedure, and in certain novel combinations and arrangements of parts, hereinafter described and particularly set out in the appended claims.

In the accompanying sheets of drawings.

Detailed reference will now be made to the accompanying drawings, which illustrate the manner of carrying out my novel method of assembling machine elements in housings, and which show apparatus of a novel and preferred form that may be used in carrying out this novel method. It should be understood, however, that the invention is not to be regarded as limited to the use of that particular arrangement of apparatus which is illustrated and disclosed herein.

Figure 4:
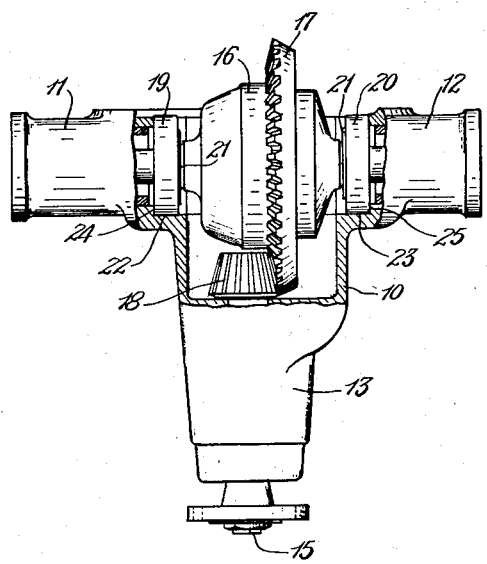
Fig. 4 is a plan view with parts in section, showing a vehicle axle assembled by the use of the method and apparatus of my invention.

Before proceeding with the detailed description of my novel method and of the apparatus for carrying out the same, I shall describe briefly one of the devices to which my invention is applicable. In this instance, the device illustrated is a vehicle driving axle of the type having a unitary or one-piece cast metal differential housing, although various other devices could be produced by the use of my novel method and apparatus. This vehicle axial is more fully disclosed in copending application Serial No. 591,098, filed February 5, 1932, and patented July 31, 1934, No. 1,968,618, and, as shown in Fig. 4 of the drawings, is provided with a housing 10 having oppositely extending integral projections 11 and 12 to which the axle tubes may be connected, and a forwardly extending integral projection 13 in which the pinion shaft 15 is mounted. A differential assembly 16, of well known form, is arranged in the housing with the main gear 17 thereof meshing with the drive pinion 18 which is actuated by the shaft 15. The differential assembly is supported in the housing by a pair of anti-friction bearings 19 and 20, and is accurately positioned in the housing by suitable shims 21 disposed between portions of the differential cage and the anti-friction bearings. The housing 10 is provided with radial bearings seats 22 and 23 which are engaged respectively by the bearings 19 and 20, and with end bearing seats 24 and 25 which are also engaged respectively by the anti-friction bearings 19 and 20.

According to my novel method for positioning the differential assembly in the differential housing with a desired press fit between the differential bearings and the housing, I support the housing in any convenient manner, and after the anti-friction bearings and shims have been mounted on the journal portions of the differential, I subject the bearings and shims to axial pressure between a pair of spaced guide members, and while this axial pressure is being maintained, the differential assembly is displaced from between the guide members and is pressed into the housing. In assembling differentials into unitary differential housings in this manner, the differential can be quickly and accurately positioned in the housing so that the main gear of the differential cooperates efficiently with the drive pinion, and with a desired press fit between the differential bearings and the housing such that an axle construction is produced which is characterized by ruggedness and quite running while in service.

Although any suitable form of apparatus may be employed for carrying out my novel method, I find that the fixture illustrated in the drawings can be used to advantage for this purpose. This fixture, as illustrated in this instance, comprises a suitable frame 27 having lateraly spaced uprights 28 and 29 between which a differential housing 13' may be received. The uprights 28 and 29 are provided with substantially aligned bearings 30 and 31 in which the housing supports 32 and 33 are reciprocably slidable. The support 32 is provided with a cylindrical portion 34 at its inner end which slidably engages in the hollow projection 11' of the differential housing. The support 33 is likewise provided at its inner end with a cylindrical portion 35 which slidably engages in the hollow extension 12' of the differential housing. These slidable supports are provided at the outer end thereof with a handle or hand grip portion 36 by means of which the supports may be individually moved into or out of supporting engagement with the hollow extensions of the housing.

Figures 1, 3:
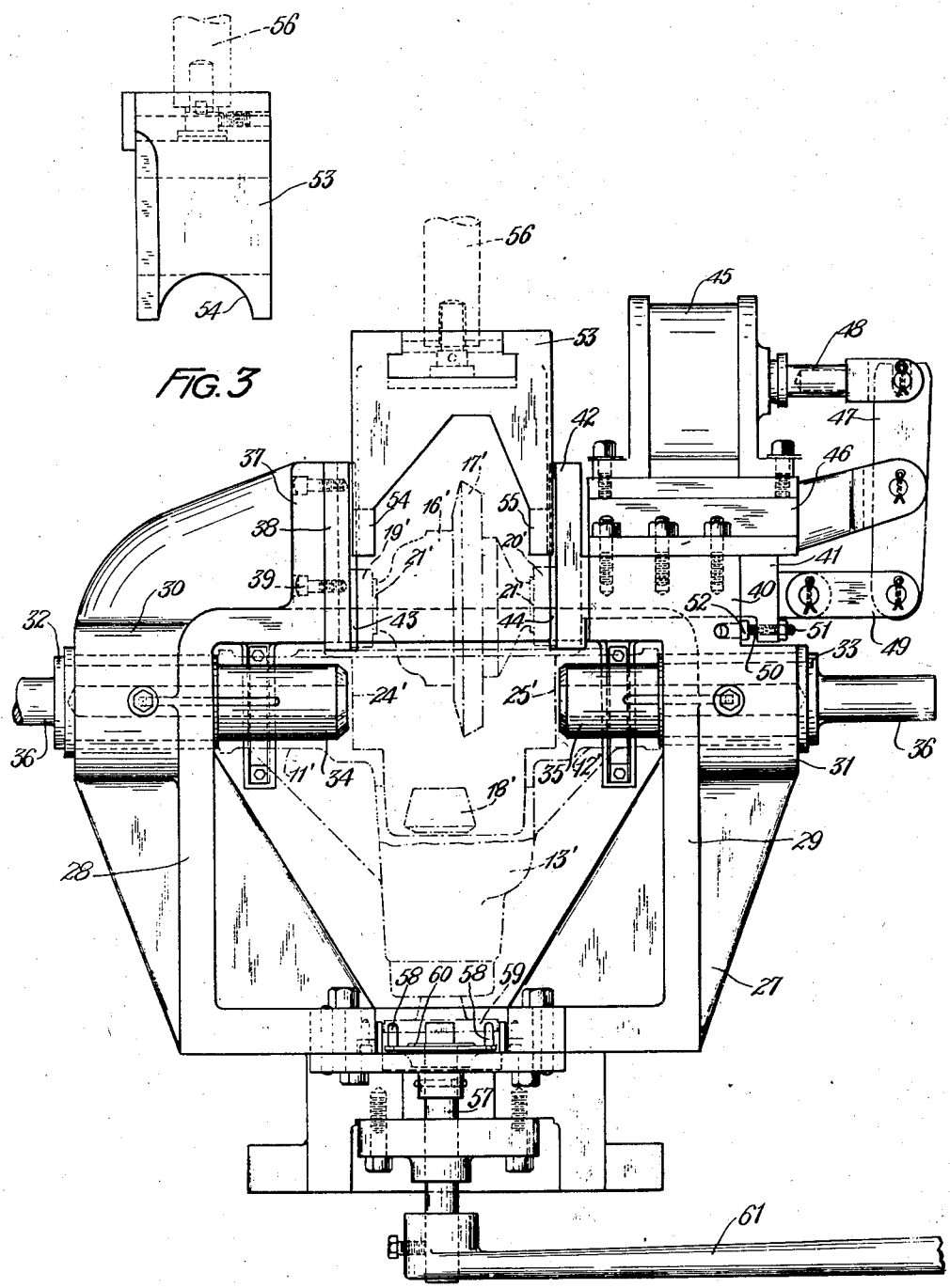
Fig. 1 is a front elevational view showing the novel apparatus of my invention.
Fig. 3 is a side elevational view of the plunger.

As shown in Fig. 1 of the drawings, the upright 28 extends above the bearing 30 to provide a support 37 to which a guide member 38 is secured, as by means of the screws 39. The upright 29 also extends above the bearing 31 to provide a support 40 in which the block 41 is slidably mounted. At its inner end the block 41 carries a guide member 42 which is similar to, and disposed in opposed relation to, the guide member 38. As shown in the drawings, the guide member 38 is positioned immediately above the housing support 32 and is provided with a flat vertically extending inner surface 43 which aligns substantially with the end bearing seat 24' of the axle housing when the latter is arranged on the supports 32 and 33. The guide member 42 is also provided with a flat vertically extending surface 44 which may be brought into substantial vertical alignment with the end bearing seat 25' of the axle housing by movement of the sliding block 41.

Figure 2:
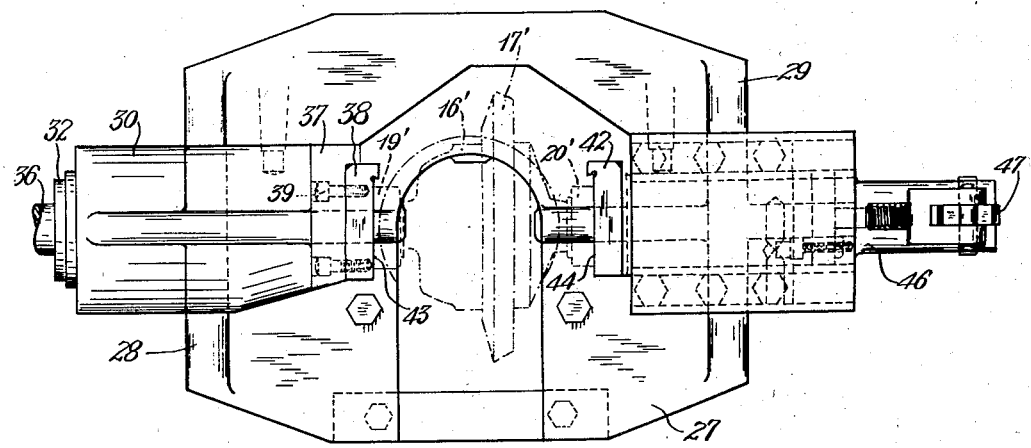
Fig. 2 is a plan view thereof with the plunger and fluid pressure cylinder removed.

When the differential 16' is to be positioned in the differential housing 13', the anti-friction bearings 19' and 20' are first pressed onto the journal portions of the differential with shims 21', of appropriate thickness, between the iner races of the bearings and the differential cage. The differential assembly thus produced is then arranged between the relatively movable guide members 38 and 42 with the anti-friction bearings arranged for engagement with the flat inner surfaces 43 and 44 of the guide members. The sliding block 41 is then moved inwardly, or to the left as seen in Figs. 1 and 2, to cause the guide member 42 to move toward the guide member 38, thereby applying axial pressure to the anti-friction bearings and to the shims of the differential assembly, and at the same time bringing the flat inner face 44 of the guide member 42 into substantial vertical alignment with the end bearing seat 25' of the housing.

For moving the sliding block 41 to subject the differential assembly to axial pressure in the manner just explained, any suitable force supplying means may be employed, but I prefer to use fluid pressure means for this purpose. In this instance, I show the fluid pressure means as being in the form of a cylinder 45, having a reciprocable piston therein, and to which fluid pressure, such as compressed air, may be supplied by suitable valve means. A bracket 46 is secured to the support 40 and affords a mount for a rocking lever 47. The cylinder 45 is secured to the bracket 46 with the piston rod 48 extending toward, and pivotally connected to, one end of the lever 47. The other end of this lever is operably connected with the sliding block 41, preferably through a link 49. With the arrangement just described, it will be seen that when fluid pressure is admitted to the cylinder 45 on one side of the piston, the lever 47 is rocked to move the guide member 42 toward the guide member 38 and thereby apply axial pressure to the differential assembly. When fluid pressure is admitted to the cylinder on the opposite side of the piston, the lever 47 is rocked in the opposite direction to move the guide member 42 away from the guide member 38 to permit a differential assembly to be conveniently positioned between the guide members by the operator.

It may be desirable to limit the inward movement of the sliding block 41, to prevent excessive pressure from being applied to the differential assembly, and also to prevent the inner face 44 of the guide member 42 from overrunning the end bearing seat 25' of the housing. To this end I provide a suitable limit stop 50 on the sliding block. In this instance, the limit stop is in the form of a screw 51, which is adjustable relative to the block, and which is arranged so that the inner end thereof engages a contact member 52 provided on the support 40.

After the differential assembly 16' has been positioned between the guide members 38 and 42 and the guide member 42 has been moved toward the guide member 38 to subject the differential assembly to axial pressure, the differential assembly is then displaced from between the guide members and pressed into the differential housing so that a desired press fit is obtained between the anti-friction bearings and the bearing seats of the housing. To displace the differential assembly into the housing while the axial pressure is thus being maintained on the differential assembly, I provide a plunger or slide 53 which is reciprocably movable between the guide members 38 and 42. This plunger is provided with spaced concave contact portions 54 and 55 which engage, respectively, the anti-friction bearings 19' and 20' when the plunger is moved downwardly to displace the differential assembly into the housing. The plunger may be actuated by any suitable power means such as a fluid pressure cylinder, not shown, having a piston actuated rod 56 operably connected to the upper end of the plunger.

When the differential assembly is being pressed downwardly into the axle housing by the plunger 53, it is necessary that the teeth of the main gear 17' mesh with the teeth of the drive pinion 18', and to facilitate such meshing of the teeth of these gear members, I provide means for adjustably rotating the drive pinion during the downward movement of the differential assembly. Any suitable means may be employed for moving the drive pinion, but I find that the desired motion can be conveniently imparted to the pinion by means of a rock shaft 57, which is journaled in the frame 27 below the differential housing, and which is provided with a pair of spaced pins 58, or other suitable means, for establishing a driving connection with the coupling 59 of the pinion shaft. In the arrangement illustrated in the drawings, the pins 58 are mounted in a head or flange 60 and are spaced apart to correspond with the spacing of the bolt holes in the pinion shaft coupling 59. Rotation may be imparted to the shaft 57 by means of a suitable lever or handle 61 attached to the lower end of this shaft.

From the foregoing description and the accompanying drawings, it should now be readily understood that I have provided a novel method and apparatus for accurately and economically positioning machine elements in the housings in which they are to operate. It will also be readily seen that by the use of my novel method a desired press fit is obtained between the machine element and the housing, and that when the machine element is a differential assembly and the housing is a differential housing of the unitary type, this press fit results in accurate positioning and efficient cooperation of the moving parts, such that a rugged and smoothly operating vehicle axle is produced. It will be understood, moreover, that I have provided novel apparatus by means of which the machine elements can be rapidly and accurately positioned in the housings, and that, by the use of this apparatus, the desired correct positioning of the parts is invariably obtained even though the work be performed by an inexperienced operator.

While I have illustrated and described the method and apparatus of my invention, it should be understood, however, that I do not wish to be limited to the exact steps of procedure, nor to the precise details of construction and arrangement of parts, as herein illustrated and described, but regard my invention as including such changes and modifications as do not involve a departure from the spirit of the invention and the scope of the appended claims.

Having thus described my invention, I claim:

1. In combination, a frame with means thereon for supporting a housing of the type having bearing seats adapted to receive bearings which support a machine element, means providing said frame with spaced portions adapted for substantial alignment with the bearing seats of said housing and to receive therebetween a machine element having bearings thereon, means for applying axial pressure to said bearings through said spaced portions, and means movable along between said spaced portions for displacing said machine element from between the same and into position in said housing with its bearings engaging said bearing seats.

2. In combination, a frame with means thereon for supporting a housing of the type having substantially coaxial bearing seats adapted to receive bearings which support a machine element, a pair of members having surfaces aligned substantially with opposed portions of the bearing seats of said housing and arranged at substantially right angles to the common axis of the bearing seats, said members being adapted to receive therebetween a machine element having bearings and having positioning means thereon, means for applying axial pressure to said bearings and positioning means through said members, and means movable between and guided by said members for displacing said machine element from between the same and into position in engagement with said bearing seats while axial pressure is being maintained.

3. In combination, a frame having a pair of relatively movable supports thereon adapted to engage a housing having substantially coaxially arranged spaced differential bearing seats therein, a pair of members disposed adjacent said supports and having surfaces aligned substantially with said bearing seats and arranged at substantially right angles to the common axis of the bearing seats, said members being adapted to receive therebetween a differential having bearings and positioning shims thereon, means for applying axial pressure to said bearings and shims through said members, and means movable between and guided by said members for displacing the differential from between the same and into position in said bearing seats while the axial pressure is being maintained.

4. In combination, a frame adapted to receive a gear housing of the type having substantially aligned hollow projections and spaced integrally formed bearing seats, a pair of supports reciprocably slidable on said frame and adapted to engage in said hollow projections, a pair of spaced relatively movable ways adapted to receive therebetween a gear element having anti-friction bearings thereon, means for causing relative movement between said ways for applying axial pressure to said bearings and for bringing the ways into substantial alignment with bearing seats of the housing, and a slide movable in said ways for displacing said gear element from between the ways and into position in the bearing seats of the housing.

5. In combination, a frame adapted to receive a gear housing having spaced bearing seats therein, means on said frame for supporting the gear housing, a guide member stationarily mounted on the frame for substantial alignment with a bearing seat of the gear housing, a second guide member movable toward and away from the first mentioned guide member, said guide members being adapted to receive therebetween a gear element having anti-friction bearings thereon, means for moving said second guide member into substantial alignment with another bearing seat of the housing and thereby applying axial pressure to said bearings, and means for displacing said gear element from between said guide members and into said housing whereby said bearings engage said seats with a press fit.

6. In combination, a frame adapted to receive a gear housing having spaced bearing seats therein, means on said frame for supporting the gear housing, a guide member stationarily mounted on the frame for substantial alignment with a bearing seat of the gear housing, a second guide member movable toward and away from the first mentioned guide member, said guide members being adapted to receive therebetween a gear element having anti-friction bearings thereon, fluid pressure responsive means for moving said second guide member into substantial alignment with another bearing seat of said housing and thereby applying axial pressure to said bearings, and means for slidably ejecting said gear element from between said guide members and into said housing whereby said bearings engage said seats with a press fit.

7. In combination, a frame having means thereon for supporting a housing of the type having seats for the bearings of a machine element, a pair of relatively movable guide members adapted to receive therebetween a machine element having anti-friction bearings thereon, fluid pressure responsive means for causing relative movement between said guide members whereby axial pressure is applied to said bearings and the guide members are aligned substantially with said bearing seats, and means for displacing said machine element from between said guide members and into the housing.

8. In combination a frame having means thereon for supporting a gear housing having a pinion therein and spaced seats for the bearings of a second gear element, a pair of relatively movable guide members adapted to receive therebetween a second gear element having anti-friction bearings thereon, means for causing relative movement between said guide members whereby axial pressure is applied to said bearings and the guide members are aligned substantially with said spaced seats, means for displacing said second gear element from between said guide members to a position in the housing between said seats and in mesh with said pinion, and means for moving said pinion during the displacement of said second gear element.

9. In combination, a frame adapted to receive a gear housing of the type having integral hollow projections and integrally formed bearing seats including opposed definitely spaced thrust seats, a pair of supports mounted for relative shifting movement on said frame and adapted to engage in said hollow projections for positioning said housing, a pair of guide members including a guide member stationarily mounted on said frame and having a surface portion which aligns substantially with one of said thrust seats of the housing and a second guide member supported on the frame for movement relative to the first mentioned guide member and having a surface portion adapted to be aligned with the other of said thrust seats, the surface portions of said guide members being adapted to receive therebetween a gear element having anti-friction bearings and positioning shims thereon, means for moving the second mentioned guide member toward the first mentioned guide member for applying axial pressure to said bearings and shims and for aligning the surface portion of the second guide member substantially with said other thrust seat, and means for displacing said gear element from between said surface portions and into position in the bearing seats of the housing while the axial pressure is being maintained.

10. In combination, a substantially rigid frame having side members spaced to receive therebetween a gear housing of the type having oppositely extending hollow projections and bearing seats therein including opposed thrust seats, a pair of supports mounted for sliding movement on the sides of said frame and adapted to engage in the hollow projections of said housing, guides arranged respectively on the sides of said frame and adapted to receive therebetween a gear element having bearings and positioning shims thereon, one of said guides aligning substantially with one of the thrust seats of said housing and the other guide being movable for applying pressure to said assembly and for aligning with the other of said thrust seats, means for actuating said other guide including a member slidably mounted on the frame and fluid pressure actuated means operatively connected with said member, and means movable between said guides for displacing the gear assembly from between the same and into position between and said thrust seats while said pressure is being maintained.

JOSEPH E. PADGETT.